Jan. 26, 1954 R. C. WEBSTER 2,667,072
FLOW MEASURING INSTRUMENT
Filed July 31, 1950
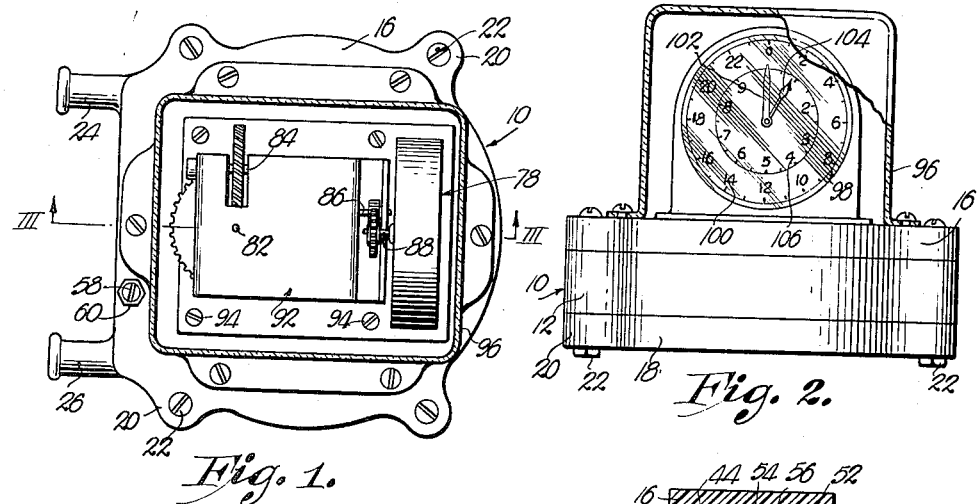
Fig. 1.
Fig. 2.
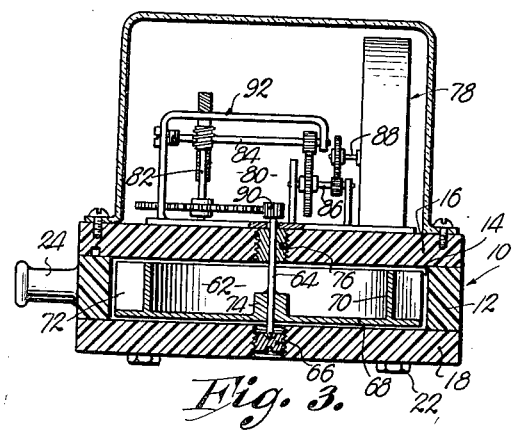
Fig. 3.
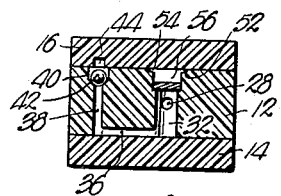
Fig. 5.
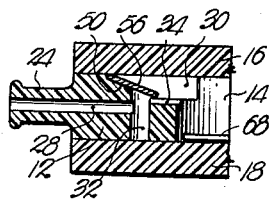
Fig. 6.
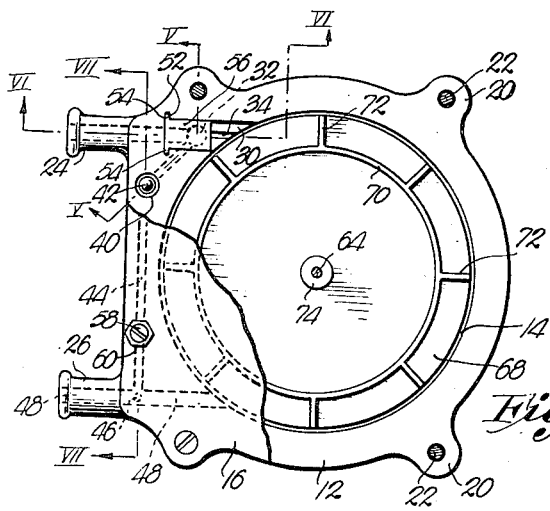
Fig. 4.
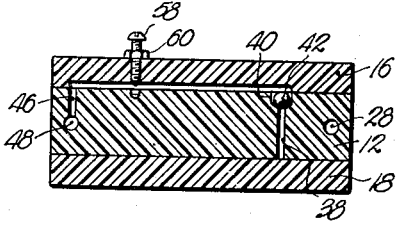
Fig. 7.
INVENTOR.
Raymond C. Webster
BY
ATTORNEY.

Patented Jan. 26, 1954

2,667,072

UNITED STATES PATENT OFFICE 2,667,072

FLOW MEASURING INSTRUMENT

Raymond C. Webster, Kansas City, Mo., assignor to W. E. Anderson, Inc., Kansas City, Mo.

Application July 31, 1950, Serial No. 176,823

5 Claims. (Cl. 73—230)

This invention relates to mechanical instruments for measuring the flow of fluids and to automatically indicate the volume of such flow with substantial accuracy and having means therein to permit adjustment whereby to maintain the desired accuracy under differing operating conditions and particularly when fluids of different densities are used with the instrument.

It is of course, impossible in instruments of this character having movable parts, to eliminate entirely the resistance caused by friction. Even after designing the parts with as much accuracy and precision as possible and arranging the same to reduce the friction to a minimum, the factor is nevertheless still present and therefore, tends to inaccuracies. These inaccuracies are greatest at minimum flow and while they progressively decrease as the flow increases, as long as the friction is present it is impossible to present an absolutely accurate instrument even at high pressures. Nevertheless, proper arrangement of parts and selection of automatic aids in the instrument, will render the presence of friction substantially insignificant at high pressures or increased volumes.

It is accordingly the most important object of the present invention to provide a fluid meter that is sufficiently accurate from the standpoint of indicating the volume flow of fluids at a rate of flow most commonly present when the instrument is placed in use under normal operating conditions.

Another important object of this invention is the provision of fluid meters particularly adapted for use in recording the volume of flowing gases such as oxygen, having means for automatically bringing the same within the range of accuracy that is needed through the provision of cooperating structure including adjustable parts capable of rendering the instrument accurate at the usual rate of flow of the gases when the instrument is in normal use.

It is an object of the present invention to provide a fluid meter that includes a suitable registering device capable of measuring the number of revolutions of a specially formed, substantially frictionless turbine disposed for rotation within the stream of flowing oxygen and having associated therewith a movable element capable of automatically increasing fluid driving forces at the lower levels of oxygen flow.

Other objects of this invention include the way in which the aforesaid automatic pressure-increasing means is disposed within the passage of flowing fluid through the instrument to cooperate with a by-pass in rendering the instrument accurate; the way in which the aforesaid by-pass progressively permits increased flow therethrough as the initial volume thereof into the instrument is increased; the manner of providing an adjustable restriction within the by-pass to control accuracies at the higher levels of volume flow; and the manner of providing a turbine that includes a rotatable vaned propeller formed to eliminate loss of driving force to a substantial degree.

Many more minor objects including details of construction, will be made clear as the specification hereof progresses, reference being had to the accompanying drawing, wherein:

Figure 1 is a top plan view of a measuring instrument for fluids made pursuant to my present invention.

Figure 2 is a front elevational view thereof.

Fig. 3 is a vertical, cross-sectional view taken on line III—III of Fig. 1, looking in the the direction of the arrows.

Fig. 4 is a top plan view, parts being broken away and removed to reveal details of construction.

Fig. 5 is a detailed, transverse, cross-sectional view taken on irregular line V—V of Fig. 4.

Fig. 6 is a fragmentary, detailed, cross-sectional view taken on irregular line VI—VI of Fig. 4; and Fig. 7 is a transverse, cross-sectional view taken on line VII—VII of Fig. 4, looking in the direction of the arrows.

The instrument hereof has been designed particularly for use in hospitals in indicating the volume flow of oxygen and other gases. However, as will hereinafter become apparent, the fluid meter is adapted for use with various and sundry fluids and by provision of adjustable means, the same can be rendered adaptable even in case of fluids of differing densities.

In the therapeutic field however, the device will have tremendous value in measuring and indicating the amount of oxygen used by an individual patient. Heretofore, patients have been required to pay for oxygen used on the basis of inaccurate computations including guesswork, since time does not usually permit recording of all oxygen used from a given tank by a particular patient. Such use is intermittent and the rate of flow differs from time to time rendering it difficult for nurses and other aids to determine with any degree of accuracy, the amount that should be charged to the patients.

Accuracies in an instrument of this kind should be greatest at the point of usual and average flow and in the case of oxygen administration, surveys have determined that such rate usually varies between 2 and 16 liters per minute.

The instrument hereof is accordingly designed and rendered adjustable to be most accurate, for example, along a range between 2 and 16 liters per minute.

Referring to the drawing, a hollow body, broadly designated by the numeral 10, includes a central portion 12 that is substantially ring-like presenting a cylindrical turbine chamber or cavity 14 that is closed by a pair of opposed, substantially identical plates 16 and 18. Body 10 is provided with a plurality of outwardly extending peripheral ears 20 serving as a means for interconnecting the sections 12, 16 and 18 by means of bolts or the like 22. Any suitable means may be provided for presenting a hermetic seal between the three sections of body 10.

A pair of tubular nozzles 24 and 26, each adapted to receive the usual flexible conduits or hoses, present inlet and outlet openings respectively to the cavity 14 of body 10. The cavity 14 and the tubular nozzles 24 and 26 form a part of a continuous fluid passageway through body 10 and as shown in Fig. 6 of the drawing, the nozzle 24 continues into body section 12 in the form of a bore 28. A cavity 30 in the body section 12 overlying the bore 28 and the nozzle 24, places the bore 28 into direct communication with the cylindrical cavity 14.

A vertical opening 32 formed in the section 12 communicates both with cavity 30 and the bore 28, all as shown in Fig. 6 of the drawing. An elongated groove 34 is formed in the body section 12 at the bottom of cavity 30 and is preferably arranged above the axis of the bore 28 and also places the vertical opening 32 in direct communication with the cavity 14. An elongated hole 36 places the lowermost end of opening 32 in direct communication with the lowermost end of a second vertical opening 38, formed in section 12, having an enlarged portion 40 at the uppermost end thereof wherein is normally seated a spherical element or ball 42.

The top plate 16 of the body 10 is provided with an elongated passage 44 at the inner face thereof extending substantially perpendicular to the axes of nozzles 24 and 26 and placing the enlarged portion 40 of opening 38 in direct communication with a third vertical opening 46 formed in the body section 12. The lowermost end of the opening 46 communicates with an outlet bore 48 formed in section 12 and registering directly with the outlet nozzle 26. It is noted that the axes of nozzles 24 and 26, bores 28 and 48, cavity 30 and groove 34, are all substantially tangential to the circumference of the cylindrical cavity 14.

One end of the cavity 30 opposite to the cavity 14 is provided with an inclined surface 50 formed in the central body section 12 adjacent the uppermost face thereof. The surface 50 overlies the bore 28 as shown in Fig. 6 and terminates at the lowermost end in opening 32. The body section 12 is also provided with a pair of opposed notches 52 at the uppermost end of surface 50 for receiving opposed ears or pintles 54 of an elongated flat plate 56. Plate 56 normally rests upon the inclined surface 50 with the lowermost edge thereof in turn resting upon the bottom wall of cavity 30 across the groove 34. Plate 56 is longer than the surface 50 and accordingly, overlies and completely covers the opening 32 when in the said normal position. The ears or pintles 54 are pivotally mounted in the notches 52 below the lowermost face of plate 16. The width of the plate 56 is substantially the same as the width of cavity 30 although plate 56 is free to swing upwardly toward the lower face of plate 16 as the same pivots on the substantially horizontal axes of pintles 54. It is noted that when plate 56 is at the lowermost end of its path of travel resting upon the bottom wall of cavity 30 and upon the flat inclined surface 50, the groove 34 remains in full intercommunication with opening 32 and cavity 14 as well as with bore 28 and nozzle 24.

A needle valve 58 threaded in the upper plate 16 of body 10 is movable to and from a position traversing and fully closing the passage 44 of plate 16 as illustrated in Fig. 7. A lock nut 60 on the screw 58 releasably holds the latter locked in an adjusted position with respect to passage 44.

A turbine broadly designated by the numeral 62 is rotatably mounted within the circular cavity 14 through the medium of a vertical shaft 64 having a pointed, lowermost end resting loosely within an inner conical cavity formed in an adjustable, preferably jeweled plug 66 carried by body section 18 in the manner clearly illustrated by Fig. 3.

The only point of appreciable wear is between the pointed end of shaft 64 and the plug 66. Use of the meter with certain types of fluids prohibits use of ordinary lubricants for this point of wear, and therefore, it is contemplated that the tip end of shaft 64 be made of osmium or like substance having high resistance to abrasion and low coefficient of friction together with anti-corrosion characteristics with respect to the fluids with which the meter is to be used.

The diameter of the turbine 62 is slightly less than the diameter of cavity 14 and includes a flat circular bottom plate 68 having an integral upstanding circular flange 70 on the uppermost face thereof that in turn is provided with a diameter less than the diameter of plate 68.

A plurality of upstanding, radial vanes or paddles 72 integral with the plate 68 and the flange 70, are spaced about the flange 70 between the outer face of the latter and the periphery of plate 68. A hub 74 centrally disposed upon the upper face of the plate 68 rigidly receives the shaft 64 and the latter extends upwardly from hub 74 loosely through a removable, preferably jeweled plug 76 within the plate 16 of body 10.

The shaft 64 operably connects with a registering or indicating device broadly designated by the numeral 78 through the medium of a train of gears. This assembly 80 includes a vertical shaft 82 and three horizontal shafts 84, 86 and 88, the latter actually being a continuation of one of the shafts of indicator 78. Each of the shafts 82, 84 and 86 is provided with a gear adjacent one end thereof and a pinion or worm adjacent its opposite end. The gear of shaft 82 is in mesh with a pinion 90 on the uppermost end of shaft 64 and the worm of shaft 82 meshes with the gear of shaft 84. The pinion and gear of shafts 84 and 86 respectively are intermeshed and likewise, the pinion and gear of shafts 86 and 88 are in meshing relation. With the exception of shaft 88, its gear and the pinion 90, all of the train of gears 80 are supported by a suitable framework broadly designated by the numeral 92 secured in any suitable fashion to the uppermost face of plate 16, such as by means of screws 94.

The indicator 78 may likewise be carried by the frame 92. The entire assembly of parts overlying the plate 16 is hermetically sealed with the body 10 through the medium of a cover 96 suitably joined to the plate 16 and thereby preventing escape of fluids that would otherwise present an unfavorable condition because of the loose fit between shaft 64 and the plug 76.

The particular nature of the mechanism 78 for registering or indicating the number of revolutions of the turbine 62, forms no part of the present invention and has, therefore, not been illustrated in detail.

It is contemplated that any suitable construction may be employed and include mechanism not differing substantially from an ordinary chronometer or watch construction. The face 98 of the device 78 differs, however, from an ordinary watch and is so calibrated as to indicate the number of liters of gas flowing through the instrument over a given period of time rather than the actual number of revolutions of the turbine 62.

Face 98 of the device 78 is conveniently calibrated in a circular row of indicia or numbers 100 corresponding to rotatable hand 102 and properly spaced to indicate 24,000 liters for each complete revolution of the hand 102. In other words, each of the numbers of row 100 thereof indicates 2000 liters. Hand 102 of device 78 completes one revolution for each 24 revolutions of the hand 104. Accordingly, each of the numbers of an inner row 106 of calibrations on face 98, indicates 100 liters. Each complete revolution of the hand 104 therefore, indicates that 1000 liters of oxygen or other fluid have passed through the instrument hereof from inlet nozzle 24 to outlet nozzle 26.

In operation, the fluid meter above described is coupled between an oxygen tank or other source of compressed fluid and the outlet nozzle 26 is in turn joined to a suitable conduit that supplies the oxygen to the usual administering mask. As the compressed oxygen is caused to flow into nozzle 24 and through proper choosing of the plate 56 with respect to size and weight, the initial flow into the cavity 14 is through groove 34 only.

It is contemplated that through use of standard hospital equipment wherein the pressure of the fluid to nozzle 24 is usually maintained within certain limits, plate 56 will remain in the position illustrated in Fig. 6 resting on the bottom of cavity 30 when less than two liters of oxygen per minute passes through nozzle 24 and bore 28. As the volume of flow increases, the plate 56 will gradually rise within the cavity 30 as it swings on pivot 54 toward the lower face of plate 16. Since the rate of flow of oxygen is seldom over 16 liters per minute, it is preferred that the instrument be designed so that plate 56 still remains out of engagement with the lower face of plate 16 even when 16 liters per minute of oxygen is directed through the instrument. Accordingly, plate 56 is within the system throughout normal use thereof but obviously becomes less important in effecting control and accuracy as the same approaches the fully open position adjacent plate 16.

Arranging of groove 34 above the axis of bore 28 causes the incoming fluid to rise against the plate 56 rather than to jet directly through the cavity 34 with less effect upon plate 56. After the plate 56 opens to a predetermined point the flow of fluid in the groove 34 has no effect tending to reduce accuracy of the meter.

Obviously, ideal operation of an instrument of this kind would require that as the volume of oxygen directed to bore 28 increases, the speed of rotation of turbine 62 would progressively and uniformly increase. However, because of the friction between the mounting means for turbine 62 and body 10 and because of the force required to operate the train of gears 80 and device 78, such factors operating against the force of fluid entering nozzle 24, produces inaccuracies at the lower volumes of flow and particularly below 2 liters per minute. Consequently, at such low volumes, the plate 56 within the passageway through the body 10, operates to increase the pressure or operating force upon the turbine 62. Manifestly, groove 34 presents a restricted passageway that is appreciably less than that of cavity 30 to overcome the resistance to rotation of turbine 62 at the lower volume flow.

At the opposite end of the curve approaching more closely 16 liters per minute for instance, the ratio of the force of fluid flow to the aforesaid resistance, becomes appreciably greater and manifestly, the element of friction becomes less and less significant. This is particularly true because of the chosen form of turbine 62 and manner of mounting the same in the body 10.

The glandless plug 76 and the pin-point support for shaft 64 in plug 66, eliminates substantially the amount of friction that would otherwise be present. Furthermore the body construction of turbine 62 is important and in this respect it is contemplated that a relatively lightweight material be used such as plastic or other synthetic composition.

It has been found further that because of the arrangement illustrated, the fluid tends to follow the peripheral side wall of cavity 14 as the same passes from nozzle 24 to nozzle 26. Accordingly, considerable weight in the turbine 62 can be eliminated by making the vanes 72 relatively short rather than extending the same from the periphery of plate 68 to the hub 74. Additionally, as the fluid enters the cavity 14 substantially tangentially thereof, it would have a tendency to move around the innermost edges of the vanes 72 if it were not for the circular flange 70. Consequently, there is presented a plurality of relatively small, yet adequate chambers or compartments between the vanes 72 for pocketing the flowing fluid and thereby utilizing the effect of the force thereof more advantageously in causing rotation of turbine 62 and meeting the resistances above set forth. Consequently, as the flow of fluid increases toward 16 liters per minute, the turbine 62 will rotate proportionately faster, causing the device 78 to indicate a greater volume of flow than is actually passing through the body 10. In order to overcome such inaccuracies at the greater volumes, by-pass 32—38—44—46 is provided. As the volume of fluid to nozzle 24 progressively increases, the ball member 42 will gradually be forced away from its seated position on the uppermost end of opening 38 to by-pass a certain amount of the fluid to the bore 48. The needle valve 58 may be set to produce maximum accuracy along the range of intended use, such as 2 and 16 liters per minute, as desired.

In addition to all of the accuracies above set forth, the fluid meter hereof is relatively inexpensive to manufacture, long-lasting and not subject to undue wear because of the fact that all of the operating parts thereof are hermetically sealed and therefore, elements that might have a deleterious effect upon the moving parts, cannot enter at any point.

Having thus described the invention, what is claimed as new and desired to be secured by Letters Patent is:

1. In a flow measuring instrument, a hollow body having a turbine chamber, an elongated cavity communicating with the chamber, an elongated inlet bore, a vertical opening interconnecting the bore and the cavity, and an outlet bore communicating with the chamber, the longitudinal axes of the cavity and the inlet bore being in spaced horizontal planes; a turbine mounted in the chamber for rotation in response to fluid flowing through the chamber from the cavity to the outlet bore; an indicator operably coupled with the turbine for registering the number of revolutions of the turbine; a plate in the cavity for controlling the flow of fluid through the cavity to the turbine; and means mounting the plate for swinging movement on a horizontal axis toward and away from the uppermost end of said opening, said plate overlying said uppermost end of the opening within the path of fluid emanating from the opening whereby a predetermined pressure of fluid is required to overcome the weight of said plate and swing the same upwardly away from the opening.

2. In a flow measuring instrument, a hollow body having a turbine chamber, a cavity communicating with the chamber, an inlet bore, a vertical opening interconnecting the bore and the cavity, and an outlet bore communicating with the chamber; a turbine mounted in the chamber for rotation in response to fluid flowing through the chamber from the cavity to the outlet bore; an indicator operably coupled with the turbine for registering the number of revolutions of the turbine; a plate in the cavity for controlling the flow of fluid through the cavity to the turbine; and means mounting the plate for swinging movement on a horizontal axis toward and away from the uppermost end of said opening, said plate overlying said uppermost end of the opening within the path of fluid emanating from the opening whereby a predetermined pressure of fluid is required to overcome the weight of said plate and swing the same upwardly away from the opening, said body having a wall forming a part of said cavity and engageable by the plate when the latter is at the lowermost end of its path of travel, there being a groove in said wall interconnecting the opening and the chamber when said plate is in engagement with the wall.

3. In a flow measuring instrument, a hollow body having a turbine chamber, an elongated cavity communicating with the chamber and having a horizontal, longitudinal axis, said body having a bottom wall forming a part of said cavity, a vertical opening extending through said bottom wall, an inlet bore communicating with said opening, and an outlet bore communicating with the chamber, said wall being provided with an elongated groove in parallelism with said axis of the cavity and interconnecting the opening and the chamber; a turbine mounted in the chamber for rotation in response to fluid flowing through the chamber from the cavity to the outlet bore; an indicator operably coupled with the turbine for registering the number of revolutions of the turbine; a plate in the cavity overlying the uppermost end of said opening and normally resting on said bottom wall across the groove thereof; and means mounting the plate for swinging movement on a horizontal axis upwardly away from the uppermost end of said opening in response to a predetermined pressure of fluid passing into the opening from the inlet bore.

4. In a flow measuring instrument, a hollow body having a circular chamber, an elongated cavity communicating with the chamber and provided with a horizontal, longitudinal axis substantially tangential to the chamber, a bottom wall and an inclined surface forming a part of said cavity, a vertical opening below the cavity and communicating therewith, an elongated, horizontal inlet bore communicating with the opening below the cavity, and an outlet bore communicating with the chamber, said wall having an elongated, horizontal groove therein; a turbine mounted in the chamber for rotation in response to fluid flowing through the chamber from the cavity to the outlet bore; an indicator operably coupled with the turbine for registering the number of revolutions of the turbine; a plate in the cavity for controlling the flow of fluid through the cavity to the turbine and normally resting on said surface with one edge thereof engaging said wall across the groove; and means mounting the plate for swinging movement on a horizontal axis toward and away from the uppermost end of said opening, said plate overlying said uppermost end of the opening within the path of fluid emanating from the opening whereby a predetermined pressure of fluid is required to overcome the weight of said plate and swing the same upwardly away from the opening.

5. In a flow measuring instrument, a hollow body having a circular chamber, an elongated cavity communicating with the chamber and provided with a horizontal, longitudinal axis substantially tangential to the chamber, a bottom wall and an inclined surface forming a part of said cavity, a vertical opening below the cavity and communicating therewith, an elongated, horizontal inlet bore communicating with the opening below the cavity, and an outlet bore communicating with the chamber, said wall having an elongated, horizontal groove therein; a turbine mounted in the chamber for rotation in response to fluid flowing through the chamber from the cavity to the outlet bore; an indicator operably coupled with the turbine for registering the number of revolutions of the turbine; a plate in the cavity for controlling the flow of fluid through the cavity to the turbine and normally resting on said surface with one edge thereof engaging said wall across the groove; and means mounting the plate for swinging movement on a horizontal axis toward and away from the uppermost end of said opening, said plate overlying said uppermost end of the opening within the path of fluid emanating from the opening whereby a predetermined pressure of fluid is required to overcome the weight of said plate and swing the same upwardly away from the opening, the longitudinal axes of the cavity, the groove and the inlet bore being in parallelism with the groove disposed in a first horizontal plane above a second horizontal plane through the longitudinal axis of the inlet bore.

RAYMOND C. WEBSTER.

References Cited in the file of this patent

UNITED STATES PATENTS

| Number | Name | Date |
|---|---|---|
| 521,493 | Ball | June 19, 1894 |
| 597,066 | Marsh | Jan. 11, 1898 |
| 1,049,329 | Bangerter | Jan. 7, 1918 |
| 1,608,059 | Borde | Nov. 23, 1926 |
| 1,941,925 | Bassett | Jan. 2, 1934 |
| 2,098,280 | Dornseif | Nov. 9, 1937 |